US009013660B2

(12) United States Patent
Peng et al.

(10) Patent No.: US 9,013,660 B2
(45) Date of Patent: Apr. 21, 2015

(54) LIQUID CRYSTAL DISPLAY DEVICE HAVING ELECTRODES WITH ELONGATED APERTURES

(71) Applicant: VastView Technology Inc., Hsinchu County (TW)

(72) Inventors: Cheng-Chung Peng, Hsinchu (TW); Yuh-Ren Shen, Tainan (TW); Hsin-Ta Lee, Taichung (TW)

(73) Assignee: VastView Technology Inc., Hsinchu County (TW)

( * ) Notice: Subject to any disclaimer, the term of this patent is extended or adjusted under 35 U.S.C. 154(b) by 251 days.

(21) Appl. No.: 13/708,496

(22) Filed: Dec. 7, 2012

(65) Prior Publication Data

US 2014/0160415 A1    Jun. 12, 2014

(51) Int. Cl.
*G02F 1/1337* (2006.01)
*G02F 1/1343* (2006.01)

(52) U.S. Cl.
CPC .... *G02F 1/133753* (2013.01); *G02F 1/134309* (2013.01); *G02F 2001/134345* (2013.01)

(58) Field of Classification Search
CPC .......................... G02F 1/133707; G02F 1/1393
USPC ........................................................ 349/129
See application file for complete search history.

(56) References Cited

U.S. PATENT DOCUMENTS

| | | | | |
|---|---|---|---|---|
| 2011/0149223 A1* | 6/2011 | Tsao et al. | ..................... | 349/141 |
| 2012/0057114 A1* | 3/2012 | Chen et al. | ..................... | 349/123 |
| 2013/0258264 A1* | 10/2013 | Peng et al. | ..................... | 349/139 |

* cited by examiner

*Primary Examiner* — Phu Vu
(74) *Attorney, Agent, or Firm* — Lin & Associates IP, Inc.

(57) ABSTRACT

A liquid crystal display (LCD) device comprises a first substrate formed with a first electrode, a second substrate formed with a second electrode and a liquid crystal layer disposed between the two substrates. The LCD device includes at least one pixel area having at least one display unit. In the display unit, the first or second electrode is formed with a plurality of elongated apertures arranged in parallel and positioned outwardly one by one from the center of the display unit along at least four different directions. The plurality of elongated apertures forms solid or dotted edges around the circumference of the first or second electrode. The solid or dotted edges of the first electrode may be aligned with or extend outwardly more or less than the solid or dotted edges of the second electrode from the center of the display unit.

49 Claims, 7 Drawing Sheets

First or Second Electrode

LIQUID CRYSTAL DISPLAY DEVICE HAVING ELECTRODES WITH ELONGATED APERTURES

BACKGROUND OF THE INVENTION

1. Field of the Invention

The present invention relates to a liquid crystal display (LCD) device, and more particularly to an LCD device with improved high transmittance and high contrast.

2. Description of Related Arts

An LCD device controls the light transmittance by using the characteristic that liquid crystal (LC) molecules present different light polarization or refraction effects under different alignments so as to produce images. A twisted nematic (TN) LCD device has good light transmittance but an extremely narrow viewing angle as influenced by the structure and optical characteristic of the LC molecules.

To solve the transmittance and viewing angle problems, a twisted vertical alignment model has been proposed so as to provide the high transmittance and the wide viewing angle. However, because the LC molecules are aligned in a vertical alignment manner, when the LC molecules are applied with a low voltage and the LCD device is watched at an inclined viewing angle, a gray-level inversion problem occurs, which causes the problem of color shift at an inclined viewing angle and influences a normal presentation of images of the LCD device.

To resolve this issue, two or more alignment domains are formed in the same pixel to form multi-domain vertical alignment (MVA) LCD device so as to eliminate the gray-level inversion problem and increase the viewing angles. In practice, three specific methods are provided. In the first method, one pixel is divided into multiple display areas, and every display area forms a different voltage by means of capacitive coupling, thereby producing the alignment effect of multiple display areas. In the second method, one pixel is divided into multiple display areas and two thin film transistors are used to make each display area form a different voltage, thereby solving the gray-level inversion problem. In the third method, the pixel is divided into two or more display areas and an electronic barrier material is covered above a part of the electrode of the display area, thereby producing the alignment effect of multiple display areas.

However, the methods for solving the gray-level inversion problem in the prior arts have complicated LCD device processes. In view of the above, it is the subject of the present invention to provide a simple method with improved high transmittance and high contrast ratio so that the LCD device can present optimal images.

SUMMARY OF THE INVENTION

The present invention has been made to provide an LCD device with high transmittance and high contrast ratio. Accordingly, the LCD device comprises a first substrate, a second substrate, an LC layer, a first alignment layer, and a second alignment layer.

The LCD device has at least one pixel area. Each pixel area has at least one display unit. In each display unit, the first substrate is formed with a first electrode and the second substrate is formed with a second electrode. The first electrode in each display unit is formed with a plurality of elongated apertures arranged in parallel along at least four different directions and positioned one by one gradually farther from the center of the display unit.

The elongated apertures arranged in the same direction are running in parallel and the length in the longitudinal direction of the elongated aperture increases as the position of the elongated aperture is farther from the center of the display unit. Preferably, in each diagonal direction of the display unit, an array of elongated apertures with gradually increasing length is arranged within the display unit.

In accordance with one aspect of the present invention, in each of the four different directions, each display unit further includes a plurality of outer elongated apertures arranged outside the elongated apertures that have increasing longitudinal length in the same direction but with decreasing longitudinal length so that the outer elongated apertures can fit in the display unit. Each of the outer elongated apertures with decreasing length may have one end opened.

In a further aspect of the present invention, the second electrode in each display unit of a pixel area also comprises an electrode pattern similar to the first electrode. A plurality of elongated apertures is arranged in the second electrode in parallel with the plurality of elongated apertures of the first electrode.

According to another aspect of the present invention, the center area of the first electrode or the second electrode is formed with an etched electrode pattern. The plurality of elongated apertures is arranged outwardly from the etched electrode pattern.

In accordance with a further aspect of the present invention, solid edges are formed on the first or second electrode around the circumference of the display unit by the elongated apertures without open ends and solid edges or dotted edges may be formed on the first or second electrode around the circumference of the display unit by the elongated apertures with open ends. Preferably, solid edges and dotted edges alternate around the circumference of the first or second electrode.

In the present invention, each solid or dotted edge of the first electrode has a corresponding solid or dotted edge on the second electrode. Some of the solid or dotted edges of the first electrode may be aligned with the corresponding solid or dotted edges of the second electrode, and some may extend more outwardly or less outwardly from the center of the display unit than the corresponding solid or dotted edges of the second electrode.

According to a further aspect of the present invention, one or two solid electrode patterns are formed on the first electrode or second electrode at each area where the elongated apertures running in two different directions meet near the solid or dotted edge. The solid electrode pattern may be replaced by an etched electrode pattern.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

Figure 1:
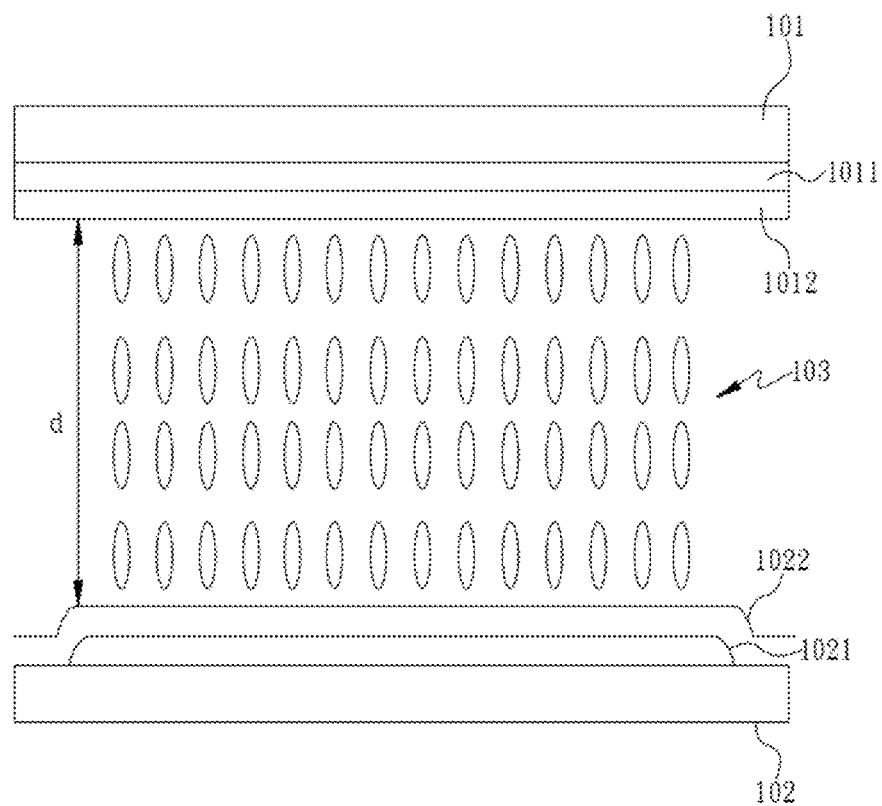
FIG. 1 shows the structure of the LCD device of the present invention.

The accompanying drawings are included to provide a further understanding of the invention, and are incorporated in and constitute a part of this specification. The drawing illustrates embodiments of the invention and, together with the description, serves to explain the principles of the invention.

With reference to FIG. 1, the LCD device of the present invention comprises a first substrate 101, a second substrate 102 and an LC layer 103 sandwiched between the first and second substrates. A plurality of display units are formed on the LCD device. Each display unit includes a first electrode 1011 and a second electrode 1021 formed respectively on the first substrate 101 and the second substrate 102. The first electrode 1011 and the second electrode 1021 are formed by transparent conductive film such as ITOs (Indium Tin Oxides). A first alignment layer 1012 is disposed between the first electrode 1011 and the LC layer 103, and a second alignment layer 1022 is disposed between the second electrode 1021 and the LC layer 103. The alignment layer may be a homeotropic alignment layer. When the applied voltage is absent, the LC molecules align perpendicular to the surface of the first and second substrates.

Figure 2:
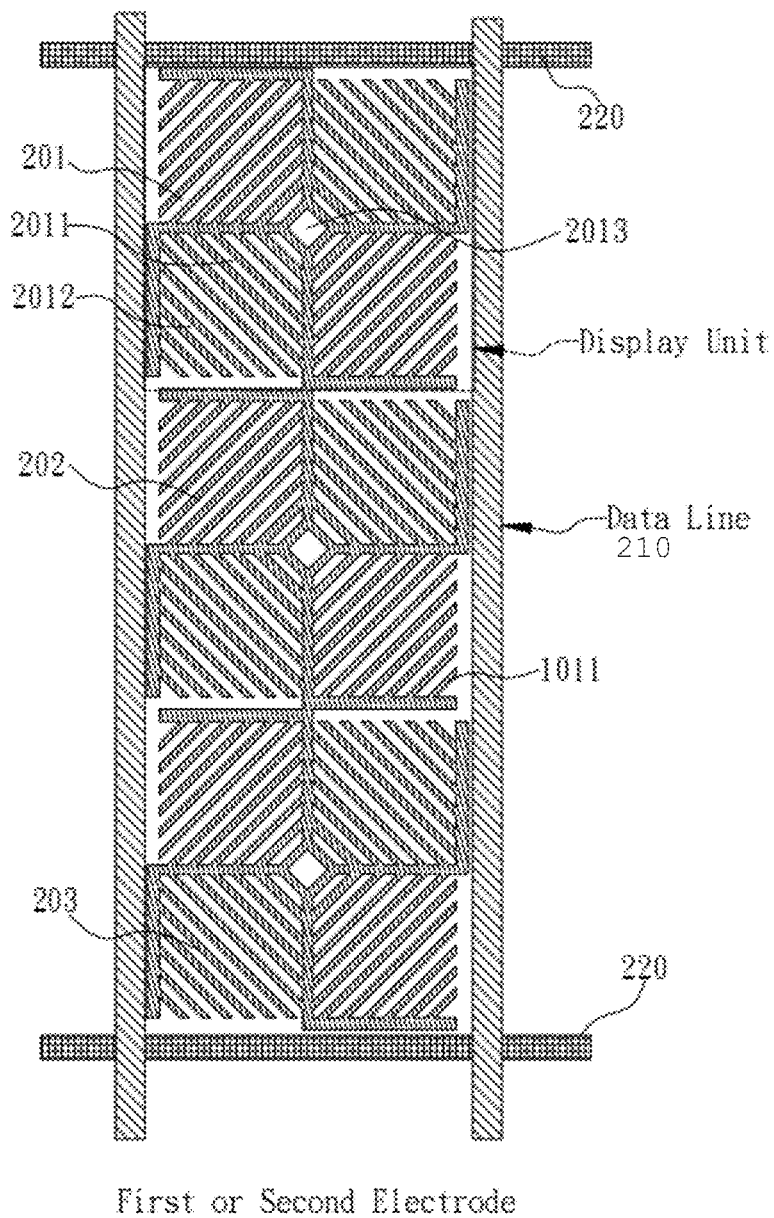
FIG. 2 shows an example of the first or second electrode in a pixel area comprising three display units of the LCD device according to an embodiment of the present invention.
Figure 3:
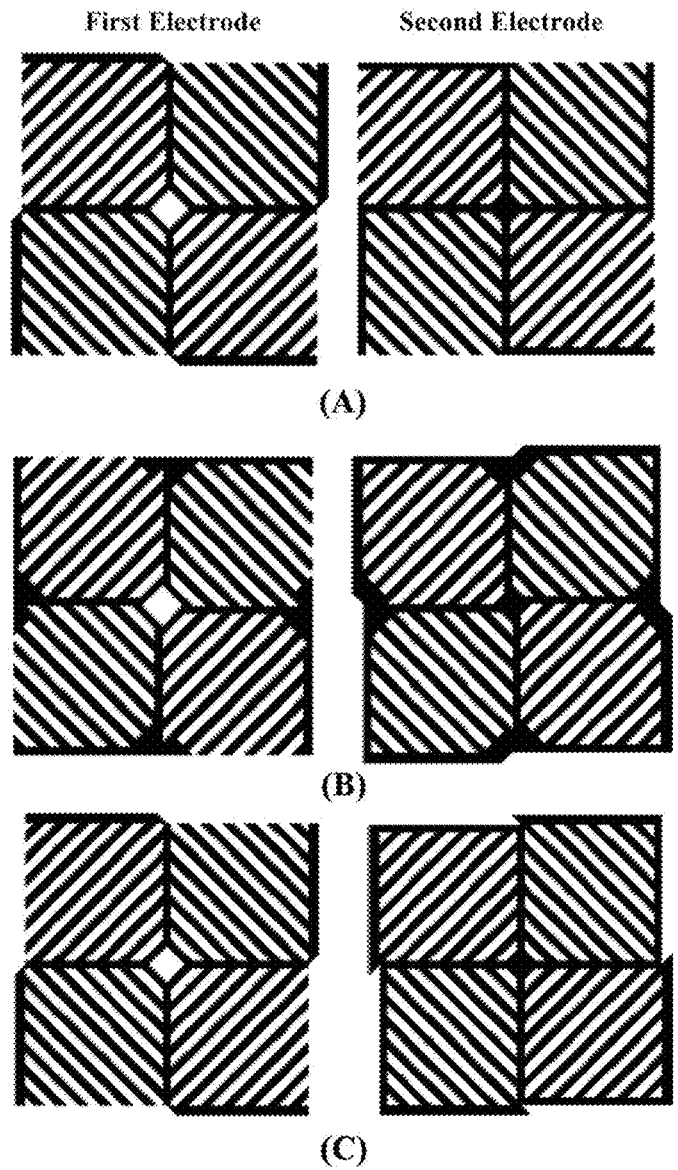
FIGS. 3A-3C show three different structures of the first and second electrodes in a display unit with solid or dotted edges according to the present invention.
Figure 4:
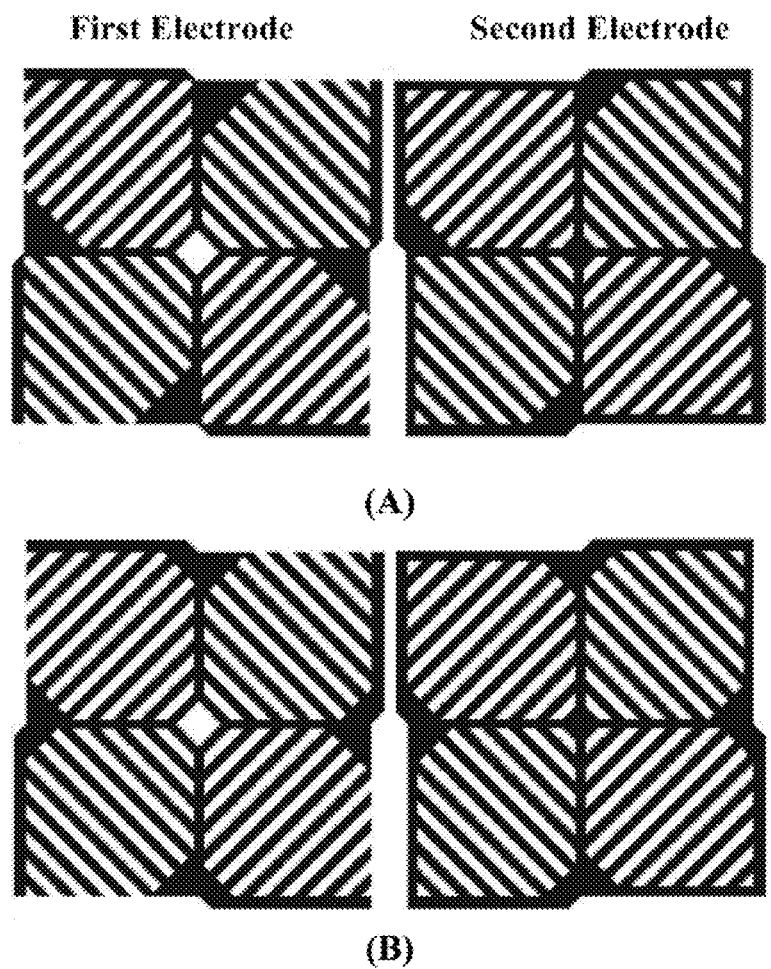
FIGS. 4A-4B show solid electrode patterns formed on the first and second electrodes in a display unit at each area where the elongated apertures running in two different directions meet near the solid or dotted edges according to the present invention.
Figure 5:
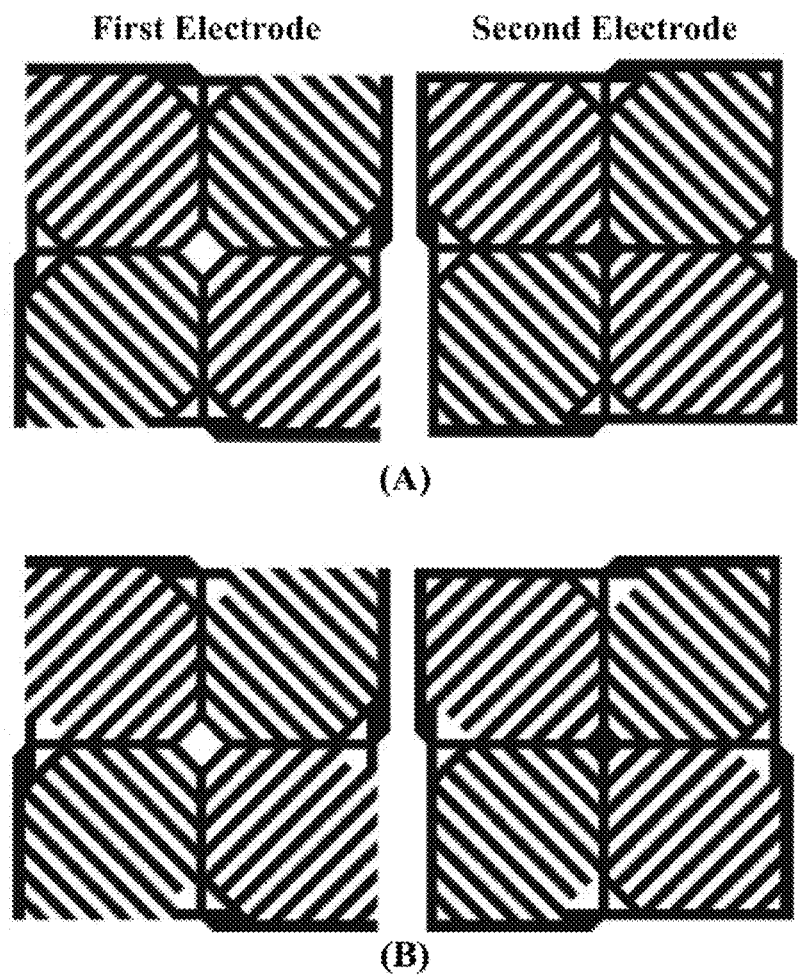
FIGS. 5A-5B show etched electrode patterns replace the solid electrode patterns on the first and second electrodes of FIGS. 4A-4B according to the present invention.
Figure 6:
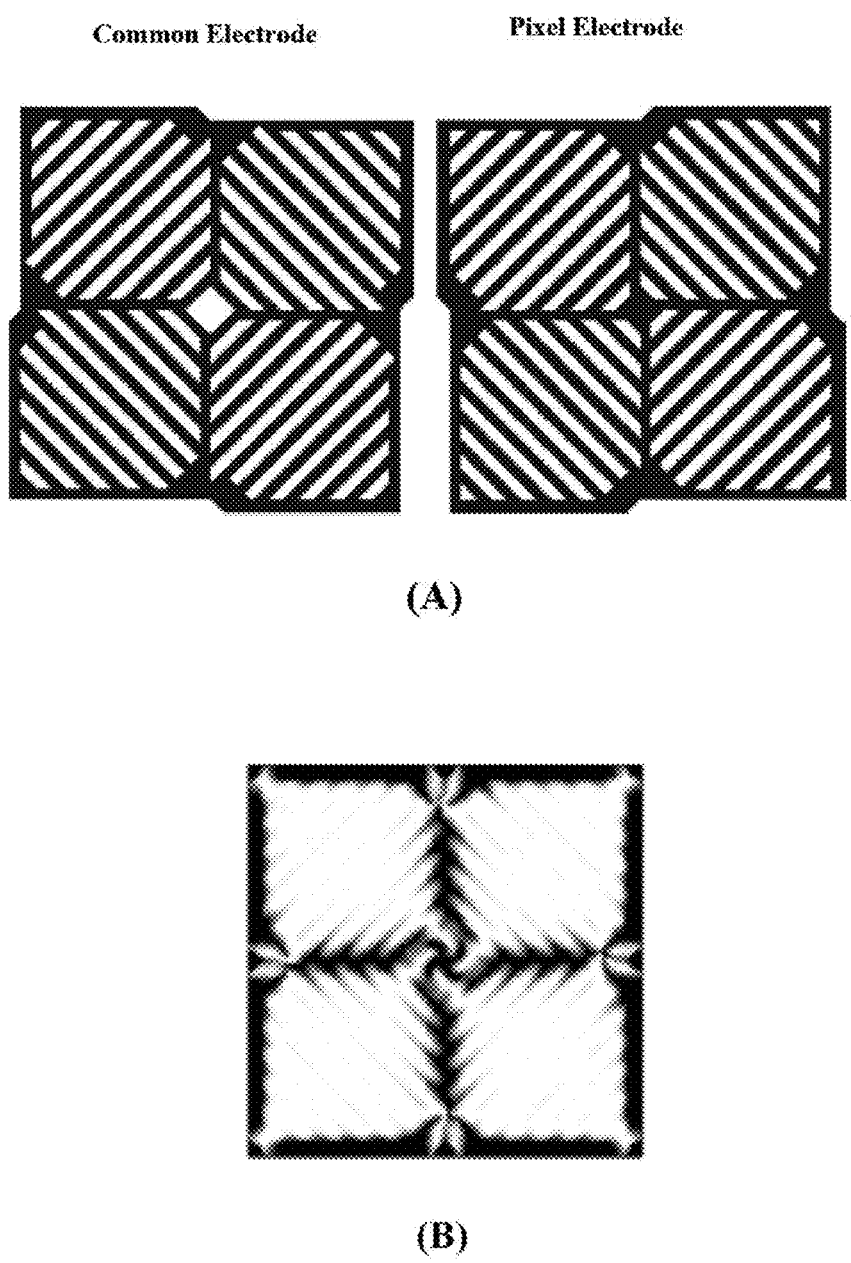
FIG. 6A shows an example of the first and second electrodes with solid edges formed around the circumferences of the first and second electrodes in a display unit according to the present invention.
FIG. 6B shows the intensity distribution of the display unit shown in FIG. 6A.

FIG. 2 shows an example of a pixel area comprising three display units 201-203 defined between two data lines 210 and two scan lines 220 of the LCD device according to an embodiment of the present invention. As shown in FIG. 2, the first electrode 1011 in each display unit is formed with a plurality of elongated apertures 2011 arranged in four different directions and positioned outwardly one by one from the center of the display unit.

The elongated apertures 2011 running in the same direction are in parallel and the length in the longitudinal direction increases as the elongated aperture is positioned farther away from the center of the display unit until one end of the elongated aperture gets closer to the data line. Afterwards, a plurality of outer elongated apertures 2012 with decreasing length in the longitudinal direction are arranged and positioned outwardly one by one until the elongated apertures substantially fill the area of the display unit.

FIG. 2 shows that the plurality of outer elongated apertures 2012 with decreasing length in the longitudinal direction each have one end opened. In other embodiments of the present invention, the elongated apertures with both ends closed may be formed instead. In the following description of this disclosure, an elongated aperture with both ends closed is referred to as a closed elongated aperture and an elongated aperture with one end opened is referred to as an unclosed elongated aperture.

According to the invention, it is preferred that the angles formed by the four longitudinal directions of the elongated apertures 2011 and the data lines are 45°, 135°, 225° and 315°. In other words, the longitudinal directions of the elongated apertures are substantially perpendicular to the diagonal directions of the display unit. Preferably, each elongated aperture is a linear aperture.

The LC layer in the LCD device of the present invention comprises nematic liquid crystal molecules of negative dielectric anisotropy ($\Delta\epsilon = \epsilon_{//} - \epsilon_{\perp} < 0$) or a liquid crystal mixture of negative dielectric anisotropic nematic liquid crystal molecules and Chiral dopant. The amount of twisted liquid crystal molecules can be determined by the parameter d/p, where d is the thickness of the LC layer and p is the Chiral pitch. The preferred value of d/p ranges from 0.166 to 0.306.

In accordance with the present invention, the plurality of closed elongated apertures 2011 and unclosed elongated apertures 2012 may be formed by etching and patterning an electrode. The center area of the first electrode may be etched with a centered electrode pattern 2013 and the plurality of closed elongated apertures 2011 and unclosed elongated apertures 2012 are arranged around the centered electrode pattern 2013. The centered electrode pattern 2013, which is preferably a quadrilateral, may be a square, rectangle or rhombus. The diagonal length of the quadrilateral is between 2 to 30 μm, preferably 3 to 20 μm.

In the present invention, the second electrode in each display unit of a pixel area may also comprise the same electrode pattern having a plurality of closed elongated apertures and unclosed elongated apertures as that in the first electrode. The center area of the second electrode may also comprise a centered electrode pattern. It should be noted that the closed elongated apertures and unclosed elongated apertures formed on the first electrode and second electrode should be running in parallel. The centered electrode pattern is formed in the center area of either the second electrode or the first electrode but not both. As can be seen in the electrodes shown in FIGS. 3-6, the centered solid electrode pattern in the center area of the second electrode corresponds to a center opening in the first electrode. Furthermore, the closed elongated apertures in the second electrode correspond to the solid elongated electrode patterns in the first electrode positionally.

As shown in FIG. 2, the plurality of unclosed longitudinal apertures 2012 on the first electrode forms solid and dotted edges around the circumference of the first electrode. The unclosed longitudinal apertures on the second electrode also form solid and dotted edges around the circumference of the second electrode.

According to the present invention, the electrode patterns of the first and second electrodes may have some variations. For example, in some embodiments, first and second electrodes have substantially identical pattern with each solid edge of the first electrode corresponding to a solid edge of the second electrode, but one of the two corresponding solid edges may extend more outwardly than the other. In other examples, all the elongated apertures on the second electrode may be closed apertures and only solid edges are formed around the circumference of the second electrode.

FIG. 3A shows an embodiment in which the first electrode and second electrode have very similar electrode patterns. The dotted edges of the first electrode line up with the corresponding dotted edges of the second electrode in each display unit but the solid edges of the first electrode extend more outwardly than the corresponding solid edges of the second electrode.

Preferably, the aligned dotted edges and the mis-aligned solid edges should alternate one another around the display unit and the solid edges of the first electrode should extend more outwardly than that of the second electrode by about 2-12 μm. Further more, each solid edge that extends more outwardly is preferably to have one end tapered towards the adjacent dotted edge with a tapering angle between 30° to 60°. The preferred size of the tapering angle is 45°.

FIG. 3B shows another embodiment of the first and second electrodes in a display unit of a pixel area according to the present invention. In this embodiment, the second electrode comprises only closed elongated apertures but the first electrode comprises both closed and unclosed elongated apertures. The second electrode only has solid edges formed around the circumference of the second electrode. The dotted edges of the first electrode are aligned with the corresponding solid edges of the second electrode but the solid edges of the first electrode extend less outwardly than the corresponding solid edges of the second electrode.

As can be seen in FIG. 3B, the more outwardly extending solid edges taper towards the less outwardly extending solid edges on the second electrode. The solid edges of the first electrode should extend less outwardly than the corresponding solid edges of the second electrode by about 2-12 μm. Each solid edge that extends more outwardly is preferably to have one end tapered towards the adjacent solid edge with a tapering angle between 30° to 60°. The preferred size of the tapering angle is 45°.

FIG. 3C shows a further embodiment of the first and second electrodes in a display unit of a pixel area according to the present invention. In this embodiment, the second electrode also comprises only closed elongated apertures but the first electrode comprises both closed and unclosed elongated apertures. All the solid edges and dotted edges of the first electrode are not aligned with the corresponding solid edges of the second electrode.

The dotted edges of the first electrode extend less outwardly than the corresponding solid edges of the second electrode but the solid edges of the first electrode extend more outwardly than the corresponding solid edges of the second electrode. As can be seen in FIG. 3C, the solid edge tapers toward the dotted edge on the first electrode with a tapering angle and the two mis-aligned solid edges on the second electrode also taper from one to the other. The tapering angles complement each other between the first electrode and the second electrode.

On the second electrode, each solid edge that extends more outwardly has one end tapering towards the adjacent solid edge that extends less outwardly. The two mis-aligned solid edges form an angle between 30° to 60°. The preferred size of the angle is 45°.

FIG. 4A-4B shows some more variations of the first and second electrodes in a display unit of a pixel area according to the present invention. In these variations, the second electrode comprises only closed elongated apertures but the first electrode comprises both closed elongated apertures and unclosed elongated apertures. All the solid or dotted edges are mis-aligned between the first electrode and the second electrode.

The dotted edges formed by the open ends of the unclosed elongated apertures of the first electrode extend less outwardly than the corresponding solid edges of the second electrode but the solid edges of the first electrode extend more outwardly than the corresponding solid edges of the second electrode.

As shown in FIG. 4A, a solid electrode pattern is formed on the first electrode at the area near each dotted edge that begins to extend more outwardly to become the adjacent solid edge. The solid electrode pattern has two perpendicular sides with one side being in line with the dotted edge that extends less outwardly and the other side being connected to the closed elongated apertures of the adjacent area whose solid edge extends more outwardly.

In the embodiment shown in FIG. 4A, the solid electrode pattern is formed at the corner of the electrode area whose dotted edge extends less outwardly. The solid electrode pattern overlaps with the ends of some closed elongated apertures and some unclosed elongated apertures on the first electrode.

On the second electrode, a solid electrode pattern is also formed at the area near each solid edge that begins to extend less outwardly. The solid electrode pattern has two perpendicular sides with one side being in line with the solid edge that extends more outwardly and the other side being connected to the closed elongated apertures of the adjacent area whose solid edge extends less outwardly. At least one side of the solid electrode pattern is perpendicular to the longitudinal direction of the closed elongated apertures.

As shown in FIG. 4A, the solid electrode pattern on the second electrode, which has a corresponding solid electrode pattern formed on the first electrode, is formed at the corner of the electrode area whose edge extends more outwardly. The solid electrode pattern overlaps with the ends of some closed elongated apertures on the second electrode. The solid electrode pattern formed on the first electrode also has at least one side perpendicular to the longitudinal direction of the closed elongated apertures.

For the solid electrode pattern formed near the location where the second electrode extends more outwardly than the first electrode, the area of the solid electrode pattern extending from the closed elongated aperture on the first electrode is greater than the corresponding area of the solid electrode pattern on the second electrode.

FIG. 4B shows another variation that is very similar to the one shown in FIG. 4A. As can be seen from FIG. 4B, in addition to the solid electrode patterns shown in FIG. 4A, another solid electrode pattern is formed immediately adjacent to each solid electrode pattern shown in FIG. 4A.

As shown in FIG. 4B, near each solid or dotted edge that begins to extend more or less outwardly, two solid electrode patterns are formed with one in the area where the edge extends less outwardly and the other in the area where the edge extends more outwardly. The two electrode patterns are connected to each other.

For the solid electrode pattern formed near the location where the second electrode extends more outwardly than the first electrode, the area of the solid electrode pattern extending from the closed elongated aperture on the first electrode is greater than the corresponding area of the solid electrode pattern on the second electrode.

For the solid electrode pattern formed near the location where the first electrode extends more outwardly than the second electrode, the area of the solid electrode pattern extending from the closed elongated aperture on the second electrode is greater than the corresponding area of the solid electrode pattern on the first electrode.

FIGS. 5A and 5B show further variations of the first and second electrodes in a display unit of a pixel area according to the present invention. These embodiments are very similar to those shown in FIGS. 4A and 4B except that the solid electrode patterns formed near the solid or dotted edges that begin to extend more or less outwardly are replaced by etched electrode patterns as shown in FIGS. 5A and 5B.

FIG. 6A illustrates another variation of the first and second electrodes in a display unit of a pixel area according to the present invent. In this embodiment, both first electrode and second electrode are formed by only a plurality of closed elongated apertures. All the solid edges formed around the circumferences of the first and second electrodes are not aligned.

Figure 7:
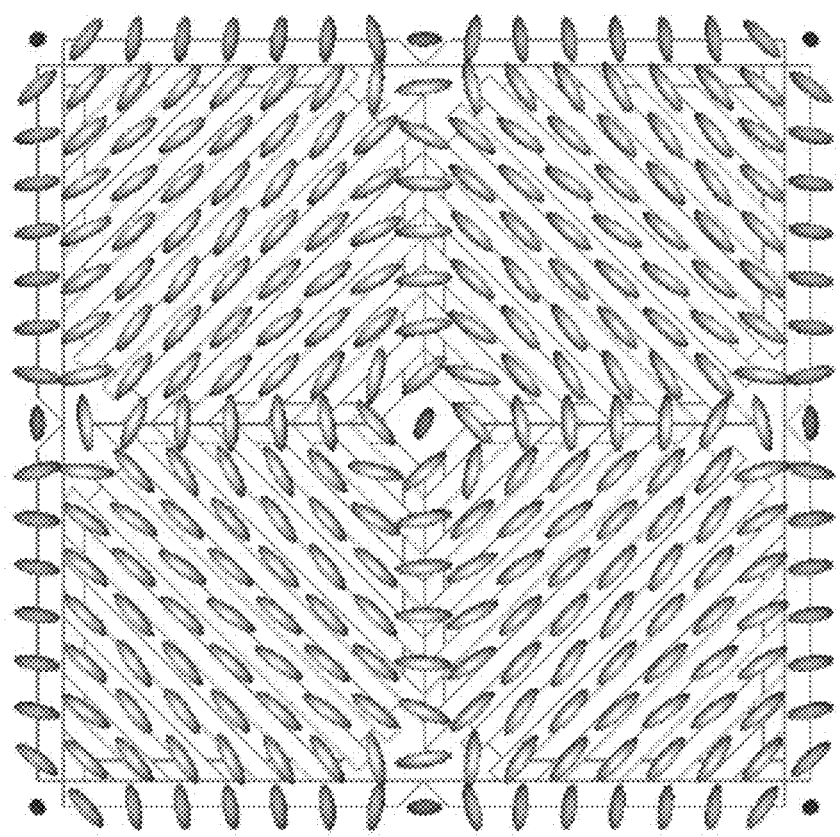
FIG. 7 shows a top view of the alignment of liquid crystal molecules located half way between the two substrates in a display unit corresponding to FIG. 6A.

Two solid electrode patterns are formed at the edge area where the closed elongated apertures running in two perpendicular directions meet. The two solid electrode patterns are formed with one in the area where the edge extends less outwardly and the other in the area where the edge extends more outwardly. FIG. 6B shows the intensity distribution of the display unit having the first and second electrodes of FIG. 6A. FIG. 7 shows a top view of the alignment of the liquid crystal molecules located half way between the two substrates in the display unit corresponding to FIG. 6B.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A liquid crystal display (LCD) device having at least one pixel area with at least one display unit, comprising:
   a first substrate having a first electrode in said display unit;
   a first alignment layer disposed below said first substrate;
   a second substrate having a second electrode in said display unit;
   a second alignment layer disposed above said second substrate; and
   a liquid crystal layer disposed between said first alignment layer and said second alignment layer;
   wherein both of said first and said second electrodes include at least a plurality of closed elongated apertures arranged in parallel and positioned outwardly one by one from a center of said display unit along at least four different directions, only one of said first and second electrodes has an opening in the center of said display unit, and the closed elongated apertures in one of said first and second electrodes correspond to solid elongated electrode patterns in the other of said first and second electrodes positionally.

2. The LCD device as claimed in claim 1, wherein data lines of said LCD device form 45°, 135°, 225° and 315° angles with said at least four different directions.

3. The LCD device as claimed in claim 2, wherein the closed elongated apertures positioned in parallel along a same direction in at least one of said at least four different directions have longitudinal lengths gradually increase as the closed elongated apertures are located farther away from the center of said display unit.

4. The LCD device as claimed in claim 2, wherein the closed elongated apertures positioned in parallel along a same direction in at least one of said at least four different directions have longitudinal lengths gradually increase and then gradually decrease as the closed elongated apertures are located farther away from the center of said display unit so that the closed elongated apertures span over the pixel area covered by said display unit.

5. The LCD device as claimed in claim 2, wherein said first electrode or said second electrode further comprises a solid electrode pattern located at the center of said display unit.

6. The LCD device as claimed in claim 2, wherein said first electrode or said second electrode further comprises an etched electrode pattern located at the center of said display unit.

7. The LCD device as claimed in claim 6, wherein said etched electrode pattern is a quadrilateral with a diagonal length between 2 to 30 µm.

8. A liquid crystal display (LCD) device having at least one pixel area with at least one display unit, comprising:
   a first substrate having a first electrode in said display unit;
   a first alignment layer disposed below said first substrate;
   a second substrate having a second electrode in said display unit;
   a second alignment layer disposed above said second substrate; and
   a liquid crystal layer disposed between said first alignment layer and said second alignment layer;
   wherein at least one of said first electrode and said second electrode includes a plurality of closed elongated apertures arranged in parallel and positioned outwardly one by one from a center of said display unit along at least four different directions, and a plurality of unclosed elongated apertures arranged in parallel with the plurality of closed elongated apertures and positioned outwardly one by one from the plurality of closed elongated apertures along at least one of said at least four different directions.

9. The LCD device as claimed in claim 8, wherein the unclosed elongated apertures positioned in parallel along a same direction have longitudinal lengths gradually decrease as the unclosed elongated apertures are positioned more outwardly, each of the unclosed elongated apertures has a closed end and an open end, and at least a dotted edge and a solid edge are formed respectively by the open ends and closed ends of the unclosed elongated apertures arranged in parallel.

10. The LCD device as claimed in claim 9, wherein said at least one of said first electrode and said second electrode has more than one dotted edge and more than one solid edge positioned alternately around an outer circumference of said at least one of said first electrode and said second electrode.

11. The LCD device as claimed in claim 10, wherein said at least one of said first electrode and said second electrode further comprises a first solid electrode pattern located at an area near each dotted edge that turns into an adjacent solid edge formed by adjacent unclosed elongated apertures, said first solid electrode pattern having at least one side perpendicular to longitudinal direction of adjacent closed elongated apertures.

12. The LCD device as claimed in claim 11, wherein said at least one of said first electrode and said second electrode further comprises a second solid electrode pattern located next to said first solid electrode pattern, said second solid electrode pattern having at least one side perpendicular to longitudinal direction of adjacent closed elongated apertures.

13. The LCD device as claimed in claim 10, wherein said at least one of said first electrode and said second electrode further comprises a first etched electrode pattern located at an area near each dotted edge that turns into an adjacent solid edge formed by adjacent unclosed elongated apertures, said first etched electrode pattern having at least one side perpendicular to longitudinal direction of adjacent closed elongated apertures.

14. The LCD device as claimed in claim 13, wherein said at least one of said first electrode and said second electrode further comprises a second etched electrode pattern located next to said first etched electrode pattern, said second etched electrode pattern having at least one side perpendicular to longitudinal direction of adjacent closed elongated apertures.

15. The LCD device as claimed in claim 10, wherein one end of each solid edge tapers to the adjacent dotted edge with a tapering angle between 30° to 60°.

16. The LCD device as claimed in claim 15, wherein the tapering angle is approximately 45°.

17. The LCD device as claimed in claim 1, wherein said liquid crystal layer comprises nematic liquid crystal molecules of negative dielectric anisotropy.

18. The LCD device as claimed in claim 1, wherein said liquid crystal layer comprises a liquid crystal mixture of negative dielectric anisotropic nematic liquid crystal molecules and Chiral dopant.

19. The LCD device as claimed in claim 18, wherein said liquid crystal layer has a characteristic parameter defined by d/p with 0.166≤d/p≤0.306, where d represents a thickness of said liquid crystal layer, and p represents a Chiral pitch.

20. A liquid crystal display (LCD) device having at least one pixel area with at least one display unit, comprising:
a first substrate having a first electrode in said display unit, said first electrode including a plurality of closed elongated apertures arranged in parallel and positioned outwardly one by one from a center of said display unit and a plurality of unclosed elongated apertures arranged in parallel with the plurality of closed elongated apertures and positioned outwardly one by one from the plurality of closed elongated apertures;
a first alignment layer disposed below said first substrate;
a second substrate having a second electrode in said display unit, said second electrode including a plurality of closed elongated apertures arranged in parallel and positioned outwardly one by one from the center of said display unit;
a second alignment layer disposed above said second substrate; and
a liquid crystal layer disposed between said first alignment layer and said second alignment layer;
wherein the closed elongated apertures of said first electrode positioned in parallel along a same direction have longitudinal lengths gradually increase as the closed elongated apertures of said first electrode are located farther away from the center of said display unit, the unclosed elongated apertures of said first electrode positioned in parallel along a same direction have longitudinal lengths gradually decrease as the unclosed elongated apertures of said first electrode are positioned more outwardly, each of the unclosed elongated apertures of said first electrode has a closed end and an open end, at least a dotted edge and a solid edge are formed respectively by the closed ends and open ends of the unclosed elongated apertures of said first electrode arranged in parallel, and the closed elongated apertures of said second electrode positioned in parallel along a same direction have longitudinal lengths gradually increase as the closed elongated apertures of said second electrode are located farther away from the center of said display unit.

21. The LCD device as claimed in claim 20, wherein said second electrode further includes a plurality of unclosed elongated apertures arranged in parallel with the plurality of closed elongated apertures of said second electrode and positioned outwardly one by one from the plurality of closed elongated apertures of said second electrode.

22. The LCD device as claimed in claim 21, wherein the unclosed elongated apertures of said second electrode positioned in parallel along a same direction have longitudinal lengths gradually decrease as the unclosed elongated apertures of said second electrode are positioned more outwardly, each of the unclosed elongated apertures of said second electrode has a closed end and an open end, and at least a dotted edge and a solid edge are formed respectively by the open ends and closed ends of the unclosed elongated apertures of said second electrode arranged in parallel.

23. The LCD device as claimed in claim 22, wherein said first electrode has more than one dotted edge and more than one solid edge positioned alternately around an outer circumference of said first electrode, and said second electrode has more than one dotted edge and more than one solid edge positioned alternately around an outer circumference of said second electrode.

24. The LCD device as claimed in claim 23, wherein the dotted edges of said first electrode and said second electrode are aligned and the solid edges of said first electrode and said second electrode are not aligned.

25. The LCD device as claimed in claim 23, wherein the dotted edges of said first electrode and said second electrode are aligned, and the solid edges of said first electrode extend more outwardly than the solid edges of said second electrode from the center of said display unit.

26. The LCD device as claimed in claim 23, wherein the solid edges of said first electrode extend more outwardly than the solid edges of said second electrode by 2-12 μm.

27. The LCD device as claimed in claim 26, wherein one end of each solid edge of the first electrode tapers to the adjacent dotted edge of said first electrode with a tapering angle between 30° to 60°.

28. The LCD device as claimed in claim 27, wherein the tapering angle is approximately 45°.

29. The LCD device as claimed in claim 20, wherein the closed elongated apertures of said second electrode positioned in parallel along a same direction have longitudinal lengths gradually increase and then gradually decrease as the closed elongated apertures of said second electrode are located farther away from the center of said display unit so that said second electrode spans over the pixel area covered by said display unit.

30. The LCD device as claimed in claim 29, wherein said first electrode has more than one dotted edge and more than one solid edge positioned alternately around an outer circumference of said first electrode, and said second electrode has only solid edges formed around an outer circumference of said second electrode.

31. The LCD device as claimed in claim 30, wherein each of the dotted edges and the solid edges of said first electrode has a corresponding solid edge of said second electrode, the dotted edges of said first electrode are aligned with the corresponding solid edges of said second electrode and the solid edges of said first electrode are not aligned with the corresponding solid edges of said second electrode.

32. The LCD device as claimed in claim 31, wherein the solid edges of said first electrode extend less outwardly than the corresponding solid edges of said second electrode from the center of said display unit.

33. The LCD device as claimed in claim 32, wherein the solid edges of said first electrode extend less outwardly than the corresponding solid edges of said second electrode by 2-12 μm.

34. The LCD device as claimed in claim 32, wherein one end of each solid edge of said second electrode corresponding to a solid edge of said first electrode tapers to the adjacent solid edge of said second electrode with a tapering angle between 30° to 60°.

35. The LCD device as claimed in claim 34, wherein the tapering angle is approximately 45°.

36. The LCD device as claimed in claim 30, wherein each of the dotted edges and the solid edges of said first electrode has a corresponding solid edge of said second electrode, the dotted edges of said first electrode are not aligned with the corresponding solid edges of said second electrode and the solid edges of said first electrode are not aligned with the corresponding solid edges of said second electrode.

37. The LCD device as claimed in claim 36, wherein the solid edges of said first electrode extend more outwardly than the corresponding solid edges of said second electrode from the center of said display unit and the dotted edges of said first electrode extend less outwardly than the corresponding solid edges of said second electrode from the center of said display unit.

38. The LCD device as claimed in claim 36, wherein each solid edge of said first electrode extends more outwardly than the corresponding solid edge of said second electrode by 2-12 µm.

39. The LCD device as claimed in claim 38, wherein one end of each solid edge of said second electrode corresponding to a dotted edge of said first electrode and the adjacent solid edge of said second electrode form a tapering angle between 30° to 60°.

40. The LCD device as claimed in claim 39, wherein the tapering angle is approximately 45°.

41. The LCD device as claimed in claim 37, wherein the solid edges of said first electrode extend more outwardly than the corresponding solid edges of said second electrode by 2-12 µm.

42. The LCD device as claimed in claim 37, wherein the dotted edges of said first electrode extend less outwardly than the corresponding solid edges of said second electrode by 2-12 µm.

43. A liquid crystal display (LCD) device having at least one pixel area with at least one display unit, comprising:
   a first substrate having a first electrode in said display unit, said first electrode including a plurality of closed elongated apertures arranged in parallel and positioned outwardly one by one from a center of said display unit;
   a first alignment layer disposed below said first substrate;
   a second substrate having a second electrode in said display unit, said second electrode including a plurality of closed elongated apertures arranged in parallel and positioned outwardly one by one from the center of said display unit;
   a second alignment layer disposed above said second substrate; and
   a liquid crystal layer disposed between said first alignment layer and said second alignment layer;
   wherein the closed elongated apertures of said first electrode or said second electrode positioned in parallel along a same direction have longitudinal lengths gradually increase and then gradually decrease as the closed elongated apertures of said first electrode or said second electrode are located farther away from the center of said display unit so that said first electrode or said second electrode spans over the pixel area covered by said display unit.

44. The LCD device as claimed in claim 43, wherein said first electrode has only solid edges formed around an outer circumference of said first electrode, said second electrode has only solid edges formed around an outer circumference of said second electrode and each of the solid edges of said first electrode has a corresponding solid edge of said second electrode.

45. The LCD device as claimed in claim 44, wherein some of the solid edges of said first electrode extend more outwardly than the corresponding solid edges of said second electrode from the center of said display unit, and some of the solid edges of said first electrode extend less outwardly than the corresponding solid edges of said second electrode from the center of said display unit.

46. The LCD device as claimed in claim 44, wherein some of the solid edges of said first electrode extend less outwardly than the corresponding solid edges of said second electrode by 2-12 µm.

47. The LCD device as claimed in claim 44, wherein some of the solid edges of said first electrode extend more outwardly than the corresponding solid edges of said second electrode by 2-12 µm.

48. The LCD device as claimed in claim 44, wherein said first electrode or said second electrode has at least one more outwardly extending solid edge tapers to an adjacent less outwardly extending solid edge with a tapering angle between 30° to 60°.

49. The LCD device as claimed in claim 48, wherein the tapering angle is approximately 45°.

* * * * *